(12) United States Patent
Anand

(10) Patent No.: US 10,748,067 B2
(45) Date of Patent: *Aug. 18, 2020

(54) KERNEL SCHEDULING BASED ON PRECEDENCE CONSTRAINTS AND/OR ARTIFICIAL INTELLIGENCE TECHNIQUES

(71) Applicant: Juniper Networks, Inc., Sunnyvale, CA (US)

(72) Inventor: Ajay Anand, Karnal (IN)

(73) Assignee: Juniper Networks, Inc., Sunnyvale, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 16/214,461

(22) Filed: Dec. 10, 2018

(65) Prior Publication Data

US 2019/0108055 A1    Apr. 11, 2019

Related U.S. Application Data

(63) Continuation of application No. 15/277,401, filed on Sep. 27, 2016, now Pat. No. 10,152,349.

(51) Int. Cl.
*G06F 9/46* (2006.01)
*G06N 5/02* (2006.01)
(Continued)

(52) U.S. Cl.
CPC .............. *G06N 5/02* (2013.01); *G06N 5/003* (2013.01); *G06N 20/00* (2019.01)

(58) Field of Classification Search
CPC .................................................... G06F 9/4881
(Continued)

(56) References Cited

U.S. PATENT DOCUMENTS 6,490,566 B1 * 12/2002 Schmidt ........... G06Q 10/06316
705/7.26
7,930,700 B1 *  4/2011 Basu ...................... G06N 7/005
718/102
(Continued)

FOREIGN PATENT DOCUMENTS

CN          103034614 A      4/2013

OTHER PUBLICATIONS

Wu et al., "Efficient Local Search for DAG Scheduling," http://ieeexplore.ieee.org/document/932715/, Aug. 7, 2002, 26 pages.

*Primary Examiner* — Mehran Kamran
(74) *Attorney, Agent, or Firm* — Harrity & Harrity, LLP

(57) ABSTRACT

A device may receive information that identifies a set of tasks to be executed and precedence constraints associated with the set of tasks. The device may store the set of tasks in a data structure including a directed acyclic graph, and may determine a set of paths based on the information that identifies the set of tasks and the precedence constraints associated with the set of tasks. Each path, of the set of paths, may include particular tasks of the set of tasks. The device may determine a set of path execution times, for the set of paths, based on an artificial intelligence technique. The device may determine a critical path, of the set of paths, based on the set of path execution times. The device may determine an execution priority of the set of tasks based on the critical path. The device may provide the set of tasks for execution based on the execution priority.

20 Claims, 8 Drawing Sheets

Network Device

120
Determine a set of paths based on the information that identifies the set of tasks and the precedence constraints associated with the set of tasks

130
Determine a set of path execution times and determine a critical path based on the set of path execution times

(51) Int. Cl.
*G06N 5/00* (2006.01)
*G06N 20/00* (2019.01)

(58) Field of Classification Search
USPC .......................................................... 718/103
See application file for complete search history.

(56) References Cited

U.S. PATENT DOCUMENTS

| | | | | |
|---|---|---|---|---|
| 8,015,564 | B1* | 9/2011 | Beyer | G06F 9/5066 |
| | | | | 718/100 |
| 8,959,525 | B2* | 2/2015 | Agarwal | G06F 9/4881 |
| | | | | 718/105 |
| 10,152,349 | B1 | 12/2018 | Anand | |
| 2005/0256818 | A1* | 11/2005 | Sun | G06Q 10/06316 |
| | | | | 705/301 |
| 2005/0257221 | A1* | 11/2005 | Inchingolo | G06Q 10/06 |
| | | | | 718/100 |
| 2006/0288346 | A1* | 12/2006 | Santos | G06F 9/4887 |
| | | | | 718/102 |
| 2008/0163213 | A1* | 7/2008 | Krasikov | G06F 9/5055 |
| | | | | 718/100 |
| 2008/0263323 | A1* | 10/2008 | Mould | G06F 9/3836 |
| | | | | 712/42 |
| 2009/0178047 | A1* | 7/2009 | Astley | H04L 47/822 |
| | | | | 718/104 |
| 2010/0004916 | A1* | 1/2010 | Stauder | G06Q 10/06 |
| | | | | 703/17 |
| 2010/0198776 | A1* | 8/2010 | Wang | G06Q 10/00 |
| | | | | 706/58 |
| 2011/0231849 | A1* | 9/2011 | Saha | G06F 9/5038 |
| | | | | 718/102 |
| 2012/0147387 | A1* | 6/2012 | Morrison | G06K 15/1857 |
| | | | | 358/1.1 |
| 2013/0047162 | A1* | 2/2013 | Stefanov | G06F 9/5033 |
| | | | | 718/102 |
| 2013/0145299 | A1* | 6/2013 | Steimle | G16H 10/40 |
| | | | | 715/771 |
| 2014/0282572 | A1* | 9/2014 | Kang | G06F 9/4881 |
| | | | | 718/103 |
| 2014/0317629 | A1* | 10/2014 | Stanfill | G06F 9/4494 |
| | | | | 718/102 |
| 2014/0325521 | A1* | 10/2014 | Li | G06F 9/5038 |
| | | | | 718/104 |
| 2015/0206092 | A1* | 7/2015 | Erhart | G06Q 10/063114 |
| | | | | 705/7.15 |
| 2016/0085584 | A1* | 3/2016 | Pedersen | G06F 9/4843 |
| | | | | 718/102 |
| 2016/0085591 | A1* | 3/2016 | Taira | G06Q 10/1097 |
| | | | | 718/103 |
| 2017/0373955 | A1* | 12/2017 | Kocoloski | G06F 11/3447 |

* cited by examiner

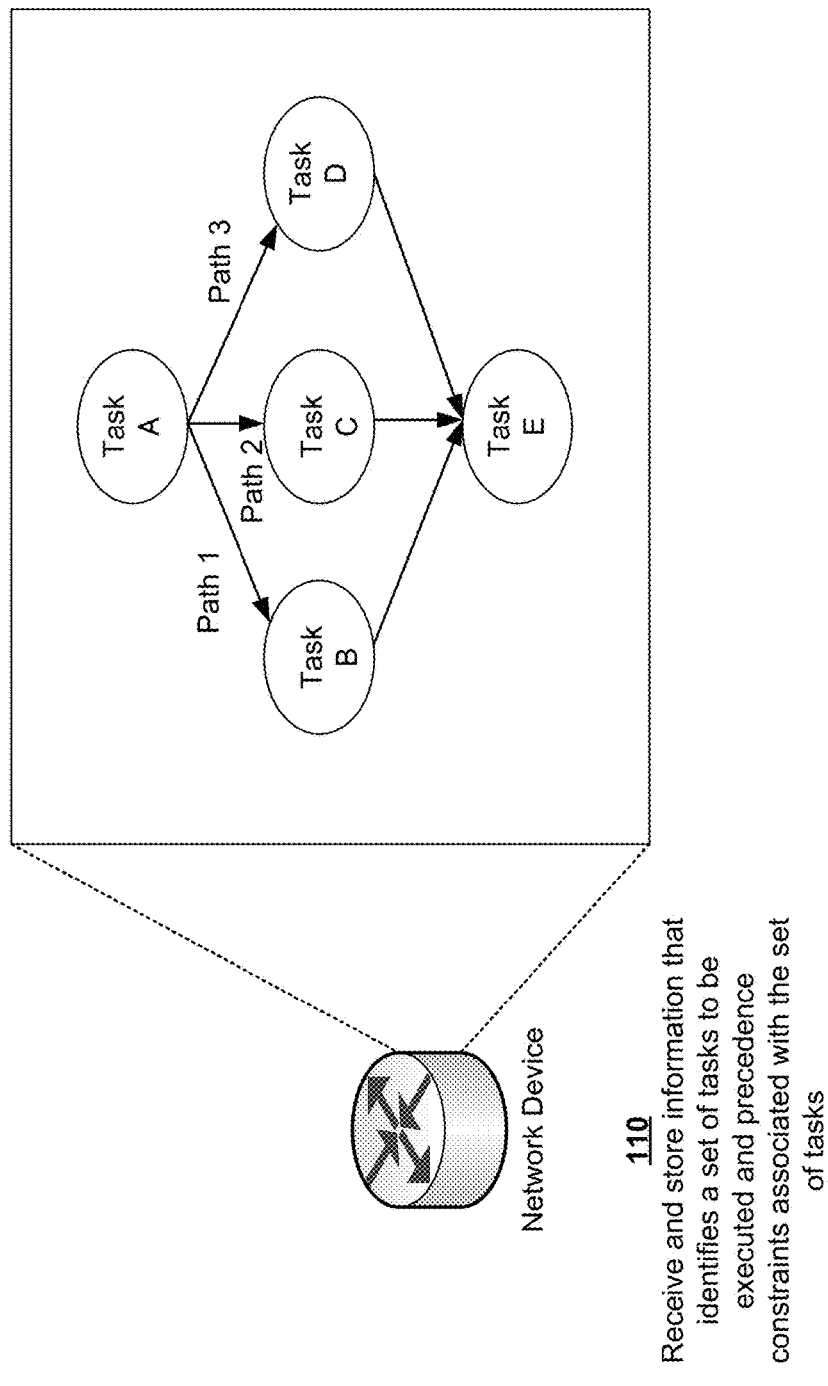

KERNEL SCHEDULING BASED ON PRECEDENCE CONSTRAINTS AND/OR ARTIFICIAL INTELLIGENCE TECHNIQUES

RELATED APPLICATION

This application is a continuation of U.S. patent application Ser. No. 15/277,401, filed Sep. 27, 2016 (now U.S. Pat. No. 10,152,349), the disclosure of which is incorporated herein by reference.

BACKGROUND

Scheduling may include a method by which tasks are assigned to resources that complete the tasks. The tasks may include virtual computational elements, such as threads, processes, or data flows, which are in turn scheduled onto hardware resources, such as processors, network links, or expansion cards.

SUMMARY

According to some possible implementations, a device may include one or more processors to receive information that identifies a set of tasks to be executed and precedence constraints associated with the set of tasks. The one or more processors may store the set of tasks in a data structure including a directed acyclic graph based on the information that identifies the set of tasks to be executed and the precedence constraints associated with the set of tasks. The one or more processors may determine a set of paths based on the information that identifies the set of tasks and the precedence constraints associated with the set of tasks. Each path, of the set of paths, may include particular tasks of the set of tasks. The one or more processors may determine a set of path execution times, for the set of paths, based on an artificial intelligence technique. The one or more processors may determine a critical path, of the set of paths, based on the set of path execution times. The one or more processors may determine an execution priority of the set of tasks based on the critical path. The one or more processors may provide the set of tasks for execution based on the execution priority.

According to some possible implementations, a non-transitory computer-readable medium may store one or more instructions that, when executed by one or more processors of a device, cause the one or more processors to receive information that identifies a set of tasks to be executed and precedence constraints associated with the set of tasks. The one or more instructions may cause the one or more processors to store the information that identifies the set of tasks and the precedence constraints in a form of a directed acyclic graph. The one or more instructions may cause the one or more processors to determine, based on the directed acyclic graph, a set of paths. The one or more instructions may cause the one or more processors to determine a set of path execution times for the set of paths. The one or more instructions may cause the one or more processors to determine a critical path of the set of paths based on the set of path execution times. The one or more instructions may cause the one or more processors to determine an execution priority of the set of tasks based on the critical path. The one or more instructions may cause the one or more processors to provide the set of tasks for execution based on the execution priority.

According to some possible implementations, a method may include receiving, by a device, information that identifies a set of tasks to be executed and precedence constraints associated with the set of tasks. The method may include storing, by the device and based on the precedence constraints, the information that identifies the set of tasks in association with a directed acyclic graph. The method may include determining, by the device, a set of paths based on the directed acyclic graph. The method may include determining, by the device, a set of path execution times, for the set of paths, based on an artificial intelligence technique. The method may include determining, by the device, a critical path, of the set of paths, based on the set of path execution times. The method may include determining, by the device, an execution priority of the set of tasks based on the critical path. The method may include providing, by the device and to one or more processing units of the device, the set of tasks for execution based on the execution priority.

BRIEF DESCRIPTION OF THE DRAWINGS

FIGS. 1A-1D are diagrams of an overview of an example implementation described herein;

DETAILED DESCRIPTION

The following detailed description of example implementations refers to the accompanying drawings. The same reference numbers in different drawings may identify the same or similar elements.

A network device (e.g., a routing device, a switching device, a firewall device, etc.) may implement particular task scheduling techniques and/or data structures for scheduling execution of tasks (e.g., processes, threads, etc.), such as priority queues, run-time queues, red-black trees, circular queues, etc. However, as network traffic and/or application demand increases, such scheduling techniques and/or data structures may prove inefficient, thereby resulting in reduced throughput, increased latency, and increased power consumption.

Implementations described herein enable a network device to arrange tasks, to be scheduled for execution, in a data structure in the form of a directed acyclic graph (DAG) based on precedence constraints (e.g., information that identifies that a particular task may need to execute before another task). Additionally, implementations described herein enable the network device to determine a critical path (e.g., a set of tasks that may be associated with the greatest amount of execution time), and to prioritize tasks associated with the critical path for execution. In this way, the network device may reduce an overall amount of time associated with execution of the tasks based on prioritizing tasks associated with the critical path (e.g., as compared to if other tasks are prioritized). In this way, implementations described herein may conserve processor and/or memory resources of the network device, may increase throughput, and may decrease latency.

Additionally, implementations described herein enable the network device to identify other paths (e.g., other than the critical path), and to increase path execution times of the other paths (e.g., by performing a power scaling technique, such as dynamic voltage scaling), thereby decreasing power consumption of processing units (e.g., processors, particular cores of processors, etc.) associated with executing tasks of the other paths. In this way, implementations described herein may conserve processor and/or memory resources of the network device, may reduce power consumption of the network device, etc.

Figure 1B:
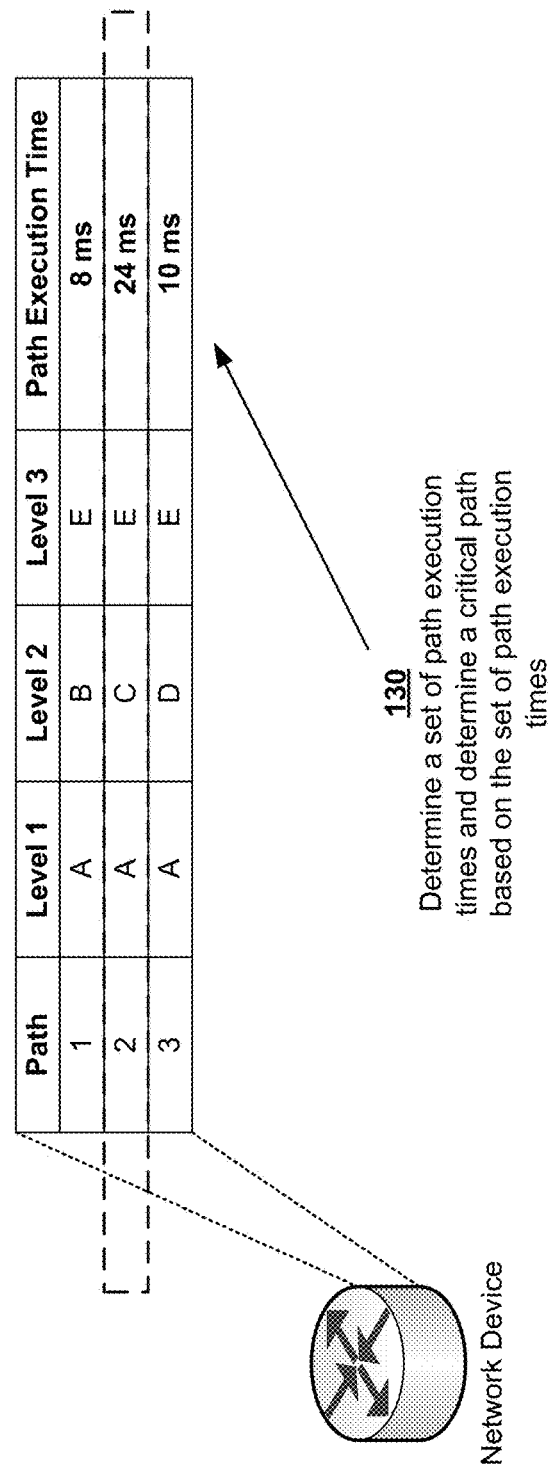

FIGS. 1A-1D are diagrams of an overview of an example implementation 100 described herein. As shown in FIG. 1A, and by reference number 110, a network device (e.g., a kernel of a network device) may receive and store information that identifies a set of tasks to be executed and precedence constraints associated with the set of tasks. For example, the network device may store the set of tasks (e.g., tasks associated with routing protocol processes, interface processes, security processes, etc.) in the form of a DAG. For example, the DAG may include a set of nodes, where nodes represent tasks and edges represent precedence constraints. That is, the directed edge from "Task A" to "Task B" indicates that "Task A" is to be executed before "Task B" (e.g., "Task B" may depend on "Task A" for a computational result). Additionally, as an example, the directed edges from "Task B," "Task C," and "Task D" to "Task E" indicate that "Task E" depends on computational results of "Task B," "Task C," and "Task D."

As shown in FIG. 1B, and by reference number 120, the network device may determine a set of paths based on the information that identifies the set of tasks and precedence constraints associated with the set of tasks. For example, a path may include a set of nodes that are ordered based on precedence constraints. As shown, "Paths 1, 2, and 3" may share a common entry node (e.g., "Task A"), and may share a common exit node (e.g., "Task E"). That is, an entry node may include a node that does not include a parent node, and an exit node may include a node that does not include a child node. As further shown, "Paths 1, 2, and 3" include different intermediate nodes (e.g., "Tasks B, C, and D," respectively).

As shown by reference number 130, the network device may determine a set of path execution times and determine a critical path based on the set of path execution times. A path execution time may represent an overall amount of time associated with execution of the tasks of a path. Additionally, the critical path may include the path having the greatest path execution time. As shown, the network device may determine that "Path 2" is the critical path. That is, an overall amount of time associated with execution of the set of tasks may depend on the critical path (e.g., the overall amount of time associated with execution of the set of tasks may not be less than 24 ms). As described elsewhere herein, the network device may determine the set of path execution times based on instruction metrics (e.g., lines of code) associated with the tasks, and/or based on implementing an artificial intelligence technique and/or a machine learning technique (e.g., based on training a model using historical execution times of the tasks).

Figure 1C:
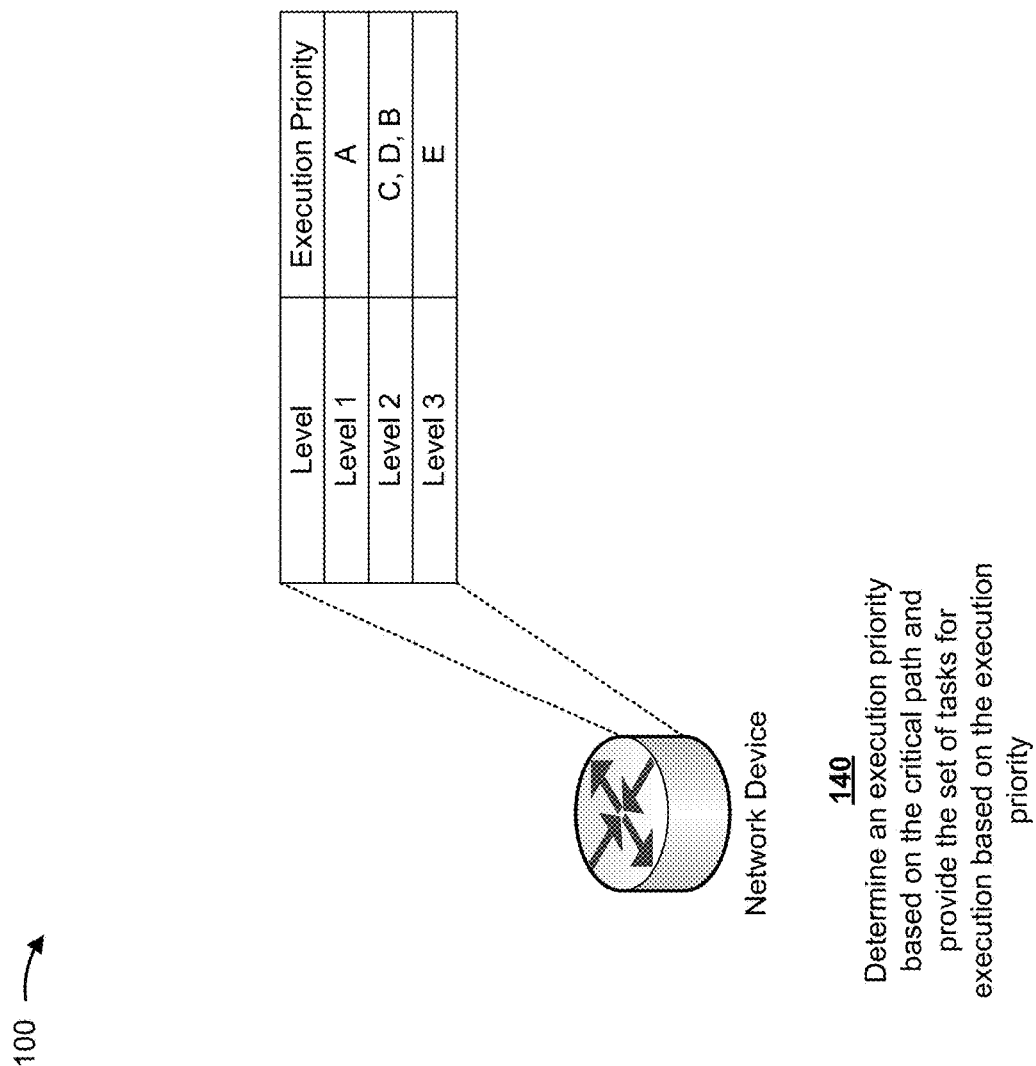

As shown in FIG. 1C, and by reference number 140, the network device may determine an execution priority based on the critical path and provide the set of tasks for execution based on the execution priority. For example, as shown, the network device may determine an execution priority based on one or more levels associated with the DAG. For example, the network device may provide "Task A" to a processing unit (e.g., based on "Task A" being the only task in "Level 1"). Additionally, for "Level 2," the network device may determine a task that is associated with the critical path (e.g., "Task C") and may prioritize the task over other tasks associated with the level (e.g., "Task D" and "Task B"). Additionally, the network device may prioritize "Task D" over "Task B" because "Task D" is associated with a path (e.g., "Path 3") that includes a greater path execution time than a path associated with "Task B" (e.g., "Path 1").

In this way, the network device may prioritize tasks for execution based on path execution times, thereby reducing the overall amount of time associated with the execution of the set of tasks. For example, assume that the network device prioritized "Task D" for execution over "Task C." In this case, the overall amount of time associated with the execution of the set of tasks may satisfy a path execution time of the critical path (e.g., may be greater than 24 ms). In this way, implementations described herein may conserve processor and/or memory resources of the network device, may increase throughput, and/or may reduce latency.

Figure 1D:
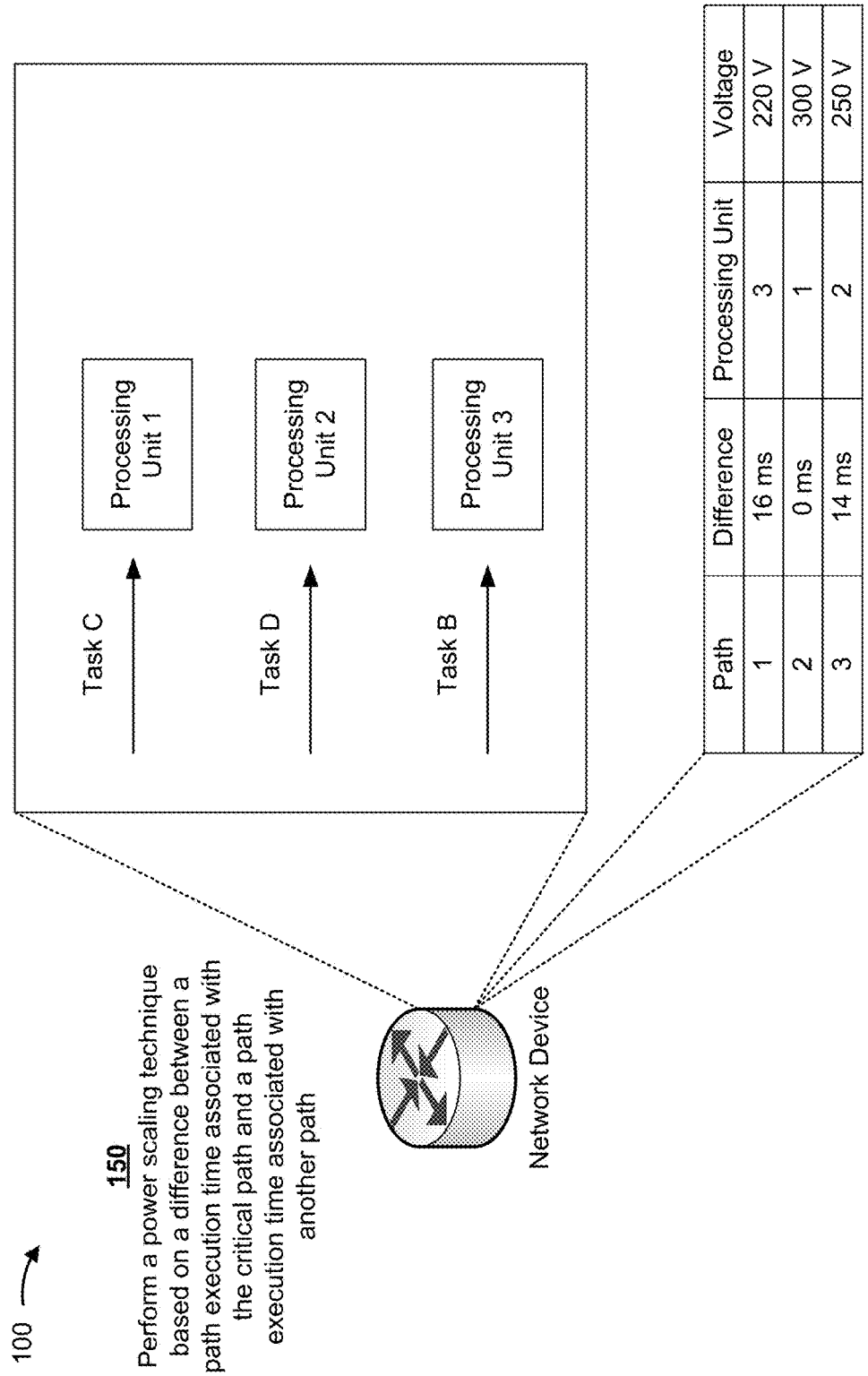

As shown in FIG. 1D, and by reference number 150, the network device may perform a power scaling technique based on a difference between a path execution time associated with the critical path and a path execution time associated with another path. For example, as shown, the network device may provide particular tasks to particular processing units for execution. As shown, "Path 1" includes a difference in path execution time of 16 ms as compared to the critical path. Similarly, "Path 3" includes a difference in path execution time of 14 ms as compared to the critical path. The network device may perform a power scaling technique (e.g., a dynamic voltage scaling technique) that may decrease respective voltages associated with "Processing Unit 1" and "Processing Unit 3," thereby increasing path execution times of "Paths 1 and 3." However, the overall amount of time of execution may not be negatively impacted (e.g., increased) because the overall amount of time of execution depends on the path execution time of the critical path. In this way, the network device may decrease power consumption without negatively affecting the overall time of execution of the set of tasks.

In this way, implementations described herein enable a network device to schedule tasks for execution based on implementing a data structure that utilizes precedence constraints and/or artificial intelligence techniques to identify critical paths, thereby enabling the network device to determine an execution priority that minimizes an overall amount of time of execution of tasks. In this way, implementations described herein may conserve computing resources, may decrease latency, and may increase throughput. Additionally, implementations described herein enable the network device to reduce power consumption by performing power scaling techniques in association with other paths that do not dictate the overall amount of time of execution of the tasks (e.g., are not critical paths).

While implementations described herein primarily relate to scheduling of tasks associated with operations of a network device, the implementations described herein are not so limited. For example, implementations described herein may be applied to any system using scheduling techniques and/or data structures for task scheduling, such as scheduling techniques associated with a kernel, or the like. Additionally, while some implementations described herein describe a set of tasks as including a particular amount of tasks, implementations described herein may be applied to sets of tasks including thousands, millions, etc. of tasks.

As indicated above, FIGS. 1A-1D are provided merely as an example. Other examples are possible and may differ from what was described with regard to FIGS. 1A-1D.

Figure 2:
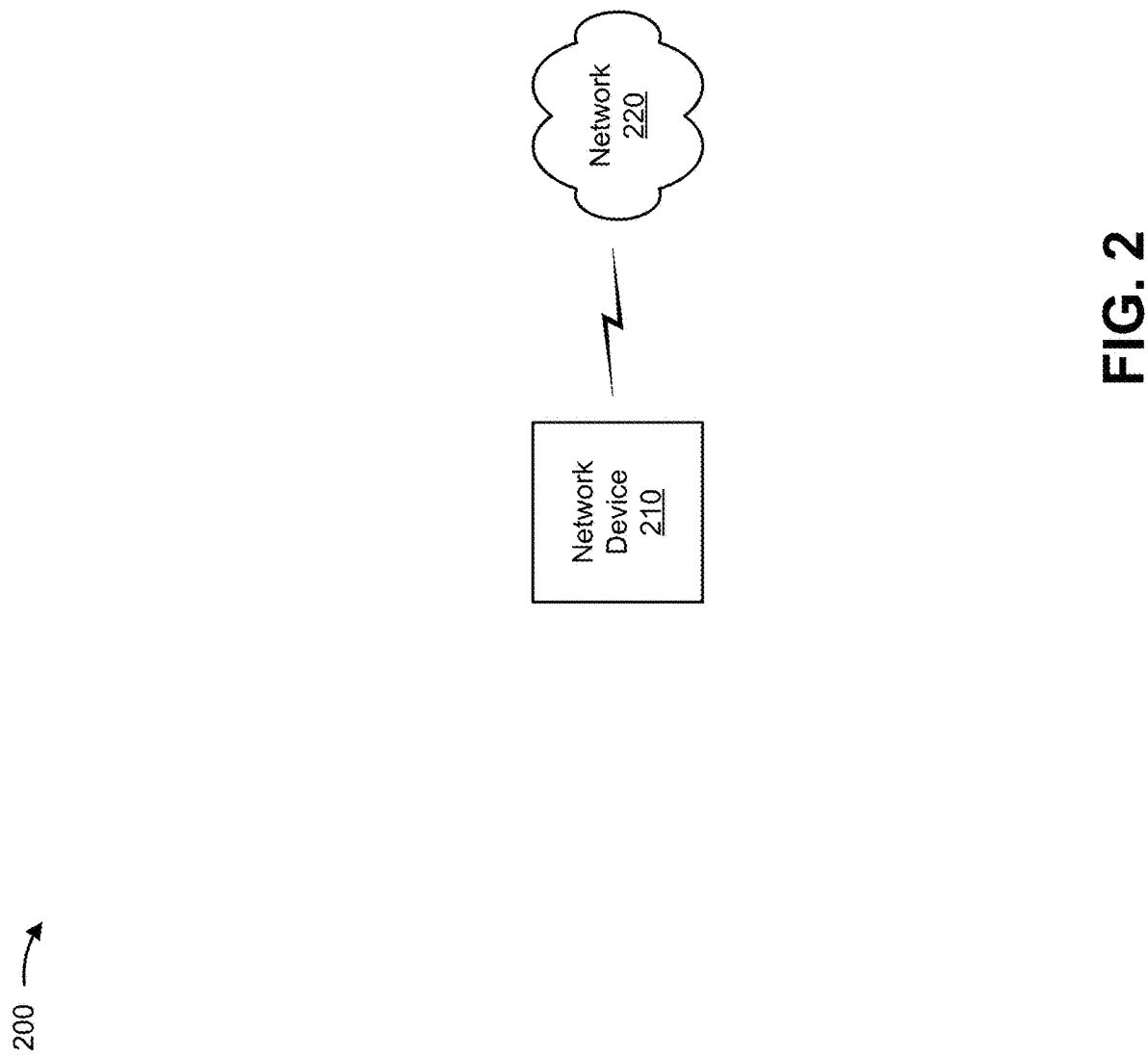
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210 and a network 220. Devices of environment 200 may interconnect via wired connections, wireless connections, or a combination of wired and wireless connections.

Network device 210 includes one or more devices (e.g., one or more traffic transfer devices) capable of processing and/or transferring traffic sent between endpoint devices. For example, network device 210 may include a firewall, a router, a gateway, a switch, a hub, a bridge, a reverse proxy, a server (e.g., a proxy server), a security device, an intrusion detection device, a load balancer, or a similar device. In some implementations, network device 210 may be associated with a kernel, a task processor, or the like, capable of processing tasks based on a scheduling technique, or the like.

Network 220 includes one or more wired and/or wireless networks. For example, network 220 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
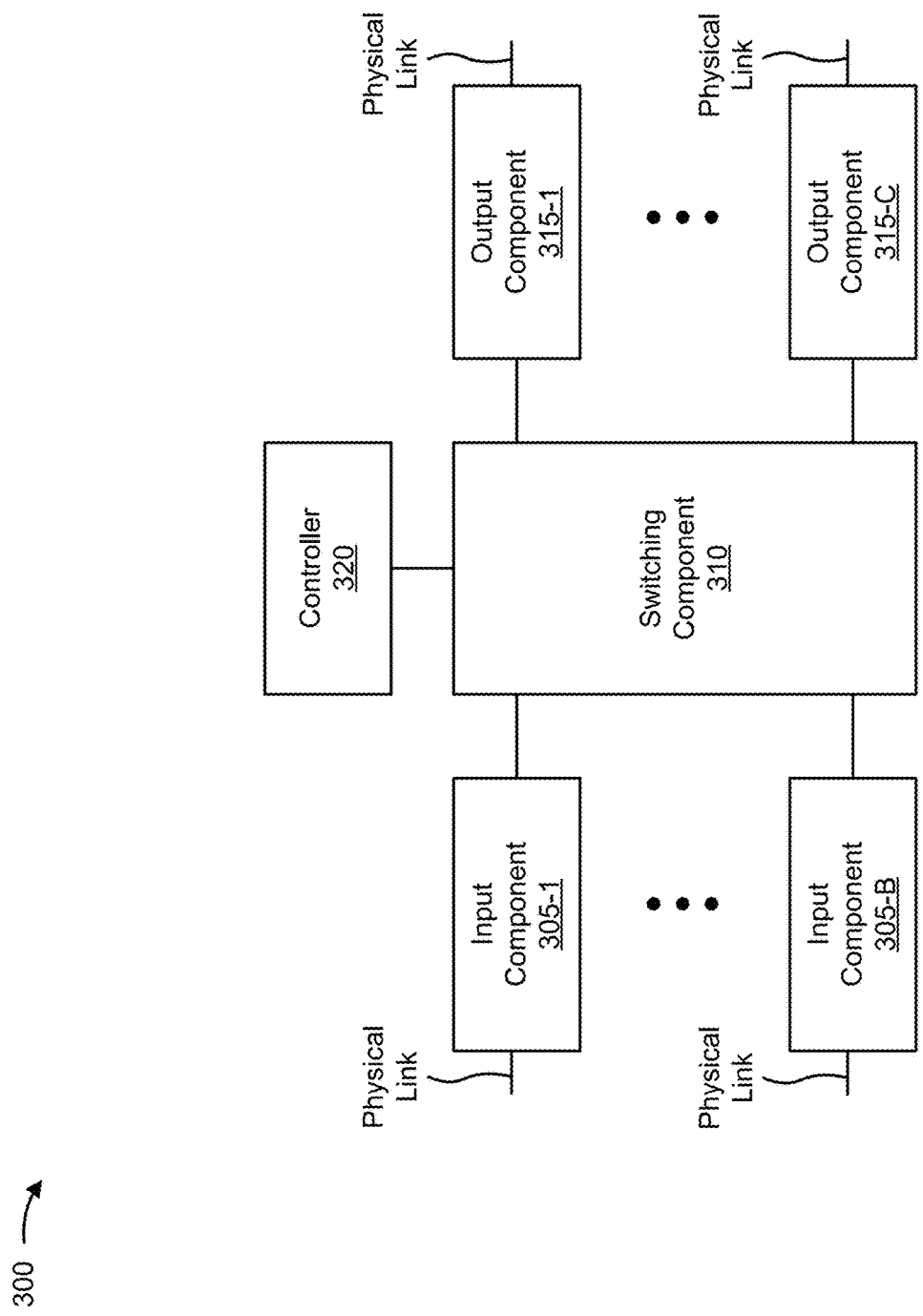
FIG. 3 is a diagram of example components of one or more devices of FIG. 2.

FIG. 3 is a diagram of example components of a device 300. Device 300 may correspond to network device 210. In some implementations, network device 210 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
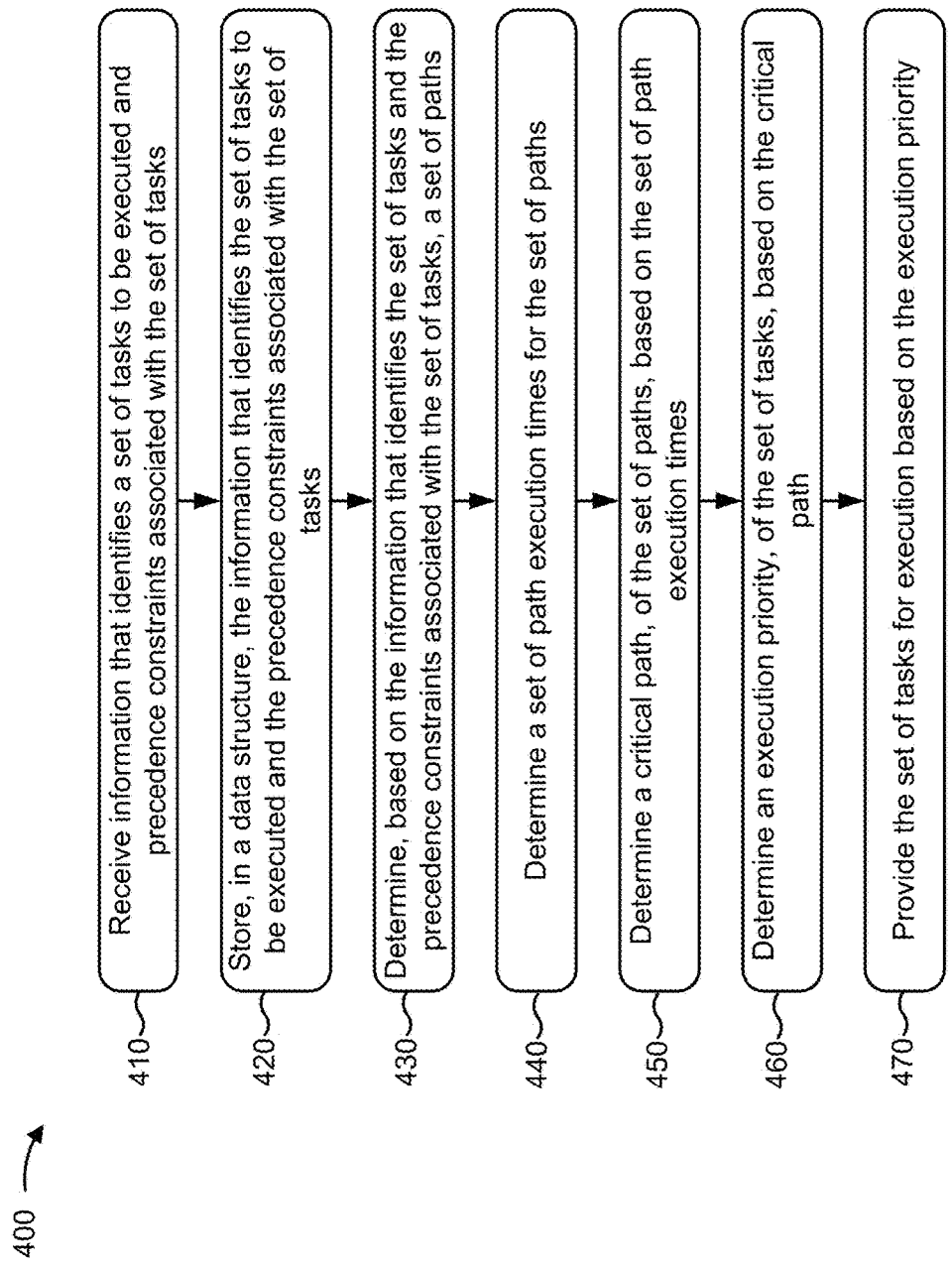
FIG. 4 is a flow chart of an example process for task scheduling based on precedence constraints and artificial intelligence techniques.

FIG. 4 is a flow chart of an example process 400 for task scheduling based on precedence constraints and artificial intelligence techniques. In some implementations, one or more process blocks of FIG. 4 may be performed by network device 210. For example, one or more process blocks of FIG. 4 may be performed by a kernel associated with network device 210, a scheduler associated with network device 210, or the like.

As shown in FIG. 4, process 400 may include receiving information that identifies a set of tasks to be executed and precedence constraints associated with the set of tasks (block 410), and storing, in a data structure, the information that identifies the set of tasks to be executed and the precedence constraints associated with the set of tasks (block 420). For example, network device 210 may receive and store, in a data structure, information that identifies a set of tasks, to be executed by a processing unit of network device 210, and precedence constraints of the set of tasks.

In some implementations, network device 210 (e.g., a kernel of network device 210) may receive information that identifies tasks (e.g., processes, threads, etc.) to be executed by a processing unit of network device 210 (e.g., a processor, a particular core of a processor, or the like). Additionally, network device 210 may receive information that identifies precedence constraints associated with the set of tasks (e.g., information that identifies that a particular task may depend on an execution result of another task). For example, network device 210 may receive information that identifies tasks, such as tasks associated with a routing engine of network device 210 and/or a forwarding engine of network device 210 (e.g., tasks associated with routing protocols, tasks that control interfaces of network device 210, tasks that manage user access to network device 210, tasks relating to security measures performed by network device 210, tasks associated with system management, etc.).

In some implementations, the data structure may include a directed acyclic graph (DAG). For example, a DAG may include a finite directed graph that does not include directed cycles (e.g., includes a topological ordering). That is, the DAG may include a set of nodes and edges, where nodes represent tasks and edges represent precedence constraints. In some implementations, a precedence constraint may identify that a first node (e.g., a first task) is to be scheduled and/or executed before a second node (e.g., a second task) is scheduled and/or executed. That is, the second node may depend on the first node for an execution result (e.g., a computational result). As used herein, "node" and "task" may be used interchangeably.

In some implementations, the information identifying the set of tasks may include information associated with a particular task. For example, the information may include information that identifies a particular type of task (e.g., a task identifier), an instruction metric associated with the task (e.g., lines of code (LOC) of the task, such as source lines of code (SLOC), physical SLOC, logical SLOC (LLOC), or the like). Additionally, or alternatively, the information identifying the set of tasks may identify dependencies between one or more tasks of the set of tasks (e.g., precedence constraints).

In some implementations, network device 210 may receive information that identifies the set of tasks and precedence constraints of the set of tasks, and may arrange the set of tasks (e.g., to be scheduled for execution) in the DAG. In this way, network device 210 may determine an execution priority of the set of tasks based on the precedence constraints and/or the information associated with the set of tasks, as described elsewhere herein.

As further shown in FIG. 4, process 400 may include determining, based on the information that identifies the set of tasks and the precedence constraints associated with the set of tasks, a set of paths (block 430). For example, network device 210 may determine a set of paths based on the information that identifies the set of tasks and the precedence constraints of the set of tasks.

In some implementations, a path may include a topologically ordered set of nodes (e.g., ordered based on precedence constraints). For example, a path may include an entry node, an exit node, and/or one or more intermediate nodes. In some implementations, an entry node may include a node that does not include a parent node. That is, an entry node may not depend on an execution result of another node. In some implementations, an exit node may include a node that does not include a child node. That is, another node may not depend on an execution result of the exit node. In some implementations, an intermediate node may include a node that includes one or more parent nodes and one or more child nodes.

In some implementations, network device 210 may determine a set of paths based on the set of tasks. For example, network device 210 may determine multiple paths that each includes a particular entry node and/or exit node (e.g., the same entry node and/or the same exit node). Additionally, the multiple paths may include particular intermediate nodes (e.g., different intermediate nodes, a combination of same intermediate nodes and different intermediate nodes, or the like). In some implementations, each path, of the set of paths, may include a common node (e.g., an entry node, an intermediate node, an exit node, or the like). Additionally, or alternatively, each path, of the set of paths, may include different nodes that may need to be scheduled and/or executed before the common node. In this way, different paths, of the set of paths, may include different path execution times, as described below.

As further shown in FIG. 4, process 400 may include determining a set of path execution times for the set of paths (block 440). For example, network device 210 may determine, for each path of the set of paths, a path execution time. In some implementations, a path execution time may represent an overall amount of time associated with execution of the tasks of the path. For example, each task may include a particular execution time (e.g., an amount of time required for execution of the task). Additionally, a path execution time may include an aggregate of respective execution times of tasks associated with the path. As an example, assume that a path includes three tasks that include execution times of 2 ms, 5 ms, and 3 ms, respectively. In this case, a path execution time of the path may include 10 ms (i.e., 2 ms+5 ms+3 ms=10 ms).

In some implementations, network device 210 may determine a path execution time, of a path, based on respective execution times of tasks associated with the path (e.g., task execution times). In some implementations, network device 210 may determine a path execution time, of a path, based on respective instruction metrics associated with each task of the path. For example, network device 210 may determine an execution time of a task based on an instruction metric (e.g., LOC) of a task, and/or a processing metric of a processing unit. In some implementations, a processing metric may include instructions per second (IPS), instructions per cycle (IPC), cycles per instruction (CPI), cycles per second (CPS), or the like. As an example, network device 210 may determine an execution time, of a task, based on a CPI value of a processing unit, a LOC value of the task, and/or a CPS value.

In some implementations, network device 210 may determine a path execution time based on performing a technique. For example, network device 210 may use one or more artificial intelligence and/or machine learning techniques to analyze data (e.g., training data, such as historical execution times of particular tasks, etc.) and create models. The techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like. Additionally, or alternatively, network device 210 may use another kind of computer-implemented technique, such as machine perception, or computer vision, to analyze data and generate models. As an example, network device 210 may receive information that identifies a task (e.g., a task identifier) and information that identifies an execution time of a task, and may implement a technique (e.g., to train a model). In this way, network device 210 may receive additional information that identifies tasks to be scheduled for execution, and may determine an execution time of the task based on the model.

In some implementations, network device 210 may determine a path execution time of a path based on performing a mathematical operation using execution times of the tasks of the path (e.g., may sum the execution times, may determine a mean execution time, may determine a median execution time, etc.). In this way, network device 210 may determine a critical path, of the paths, based on the path execution times of the paths, as described below.

As further shown in FIG. 4, process 400 may include determining a critical path, of the set of paths, based on the set of path execution times (block 450). For example, network device 210 may determine a critical path, of the set of paths, based on respective path execution times of the set of paths. In some implementations, a critical path may include a path, of the set of paths, that is associated with the greatest path execution time. Additionally, or alternatively, the critical path may include a path that is associated with the most intermediate nodes, nodes having the most precedence constraints, or the like. In some implementations, network device 210 may compare path execution times, of the set of paths, and may determine a critical path based on comparing the path execution times.

In some implementations, the overall time of execution of the set of tasks (e.g., associated with various paths) may depend on tasks associated with the critical path. That is, the overall time of execution of the set of tasks may not be less than a path execution time of the critical path. In some implementations, network device 210 may prioritize tasks, associated with the critical path, for execution (e.g., prioritize tasks associated with the critical path over tasks associated with other paths), as described elsewhere herein. In this way, network device 210 may reduce the overall time of execution of the set of tasks (e.g., as compared to if network device 210 prioritized other tasks, of other paths, over tasks associated with the critical path), thereby conserving processor and/or memory resources of network device 210, increasing throughput, and reducing latency.

As further shown in FIG. 4, process 400 may include determining an execution priority, of the set of tasks, based on the critical path (block 460), and providing the set of tasks for execution based on the execution priority (block 470). For example, network device 210 may determine an execution priority, of the set of tasks, based on the critical path, and may provide the tasks for execution based on the execution priority. In some implementations, an execution priority may identify an order in which tasks may be scheduled for execution and/or executed by a processing unit.

In some implementations, network device 210 may determine an execution priority based on multiple levels of the DAG. For example, the DAG may store tasks in association with particular levels. As an example, an entry node of a path may be associated with a first level, one or more first child nodes (e.g., intermediate nodes) of the entry node may be associated with a second level, one or more second child nodes of the first child nodes may be associated with a third level, etc. Additionally, as an example, an exit node may be associated with a last level of the set of paths. That is, a path may include multiple levels that correspond to respective tasks of the path. In other words, a path that includes one hundred tasks may include one hundred levels. Alternatively, a path that includes a particular amount of tasks may include a different amount of levels than the amount of tasks.

In some implementations, network device 210 may determine an execution priority, of tasks associated with a particular level, based on the critical path and provide the tasks for execution based on the execution priority. For example, network device 210 may determine tasks that are associated with a level, may identify a task that is associated with the critical path, and may prioritize the task associated with the critical path (e.g., may prioritize the task associated with the critical path over other tasks, of the level, that are associated with other paths). Additionally, or alternatively, network device 210 may determine other tasks that are associated with the level (e.g., tasks associated with other paths besides the critical path), and may determine an execution priority of the other tasks based on respective path execution times of the respective paths. For example, network device 210 may determine an execution priority that provides priority for tasks associated with paths that include greater path execution times than other paths.

In some implementations, network device 210 may provide tasks for execution based on the execution priority. For example, network device 210 may remove a task from the DAG, may allocate the task to a processing unit (e.g., a processing unit that is associated with an earliest start time of execution, a processing unit that is associated with a particular processing metric, a least loaded processing unit, an available processing unit, or the like). In some implementations, network device 210 may determine that a particular task has remained in the data structure (e.g., awaiting scheduling and/or execution) for a threshold amount of time, and may provide the particular task for execution based on the amount of time satisfying the threshold.

In some implementations, network device 210 may identify an execution result (e.g., a computational result) of a particular task of a path, and may reuse the execution result of the particular task in association with another task of another path. As an example, assume that two paths both include a common task. In this case, network device 210 may execute the task once, and may reuse the result of the task for the other path. In this way, network device 210 may reduce an amount of execution of tasks, thereby conserving processor and/or memory resources of network device 210, increasing throughput, and reducing latency.

In this way, network device 210 may reduce an overall time of execution of a set of tasks based on determining an execution priority based on the critical path. In other words, by scheduling and/or providing tasks, associated with the critical path, for execution before other tasks, network device 210 may decrease an overall time of execution of the set of tasks. In this way, network device 210 may conserve processor resources, memory resources, and/or may conserve network resources. Additionally, in this way, network device 210 may decrease latency, may improve throughput, and/or increase efficiency of processing, thereby conserving computing resources and network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
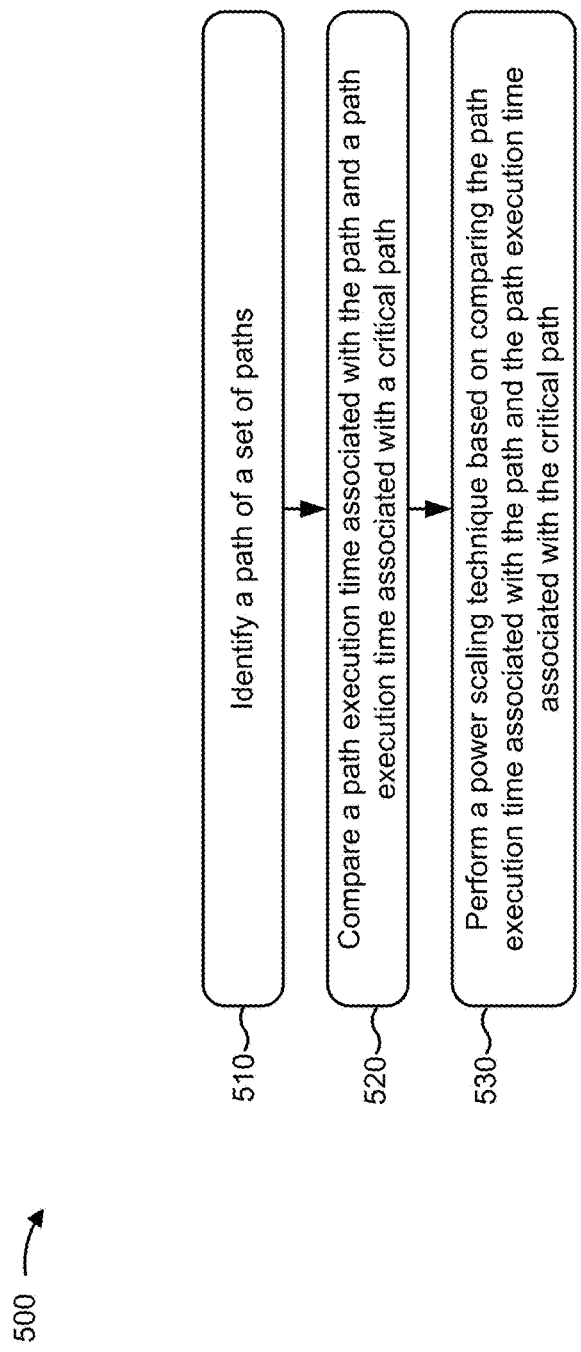
FIG. 5 is a flow chart of an example process for performing a power scaling technique to reduce power consumption during task execution.

FIG. 5 is a flow chart of an example process 500 for performing a power scaling technique to reduce power consumption during task execution. In some implementations, one or more process blocks of FIG. 5 may be performed by network device 210. For example, one or more process blocks of FIG. 5 may be performed by a kernel associated with network device 210, a scheduler associated with network device 210, or the like.

As shown in FIG. 5, process 500 may include identifying a path of a set of paths (block 510), and comparing a path execution time associated with the path and a path execution time associated with a critical path (block 520). For example, network device 210 may identify a path (e.g., other than the critical path), of the set of paths (e.g., as described above in connection with block 430), and may compare a path execution time of the path and a path execution time of the critical path (e.g., path execution times as described above in connection block 440).

In some implementations, network device 210 may identify another path and may identify a path execution time of the other path. Additionally, or alternatively, network device 210 may compare the path execution time of the other path and a path execution time of the critical path (e.g., a critical path execution time), and may determine a difference between the path execution time and the critical path execution time. As an example, the critical path execution time may satisfy the path execution time. That is, the critical path execution time may be greater than the path execution time of the other path.

In some implementations, network device 210 may determine respective differences between path execution times of the other paths and the critical path execution time, and may perform a power scaling technique based on the respective differences, as described below.

As further shown in FIG. 5, process 500 may include performing a power scaling technique based on comparing the path execution time associated with the path and the path execution time associated with the critical path (block 530). For example, network device 210 may perform a power scaling technique based on comparing the path execution time and the critical path execution time. As described elsewhere herein, the overall amount of time associated with execution of the set of tasks may depend on the critical path. Thereby, network device 210 may perform a power scaling technique to adjust (e.g., increase) path execution times of the other paths (e.g., thereby decreasing power consumption), without adjusting the overall amount of time associated with execution of the set of tasks.

In some implementations, network device 210 may perform a power scaling technique (e.g., a dynamic voltage scaling technique, an undervolting technique, an underclocking technique, or the like) based on a difference between a path execution time and a critical path execution time. For example, network device 210 may provide tasks, associated with another path, to one or more processing units, and may cause the one or more processing units to decrease a voltage, decrease a clock rate, or the like, thereby increasing a path execution time of the path.

In some implementations, the power consumed by a processing unit may be represented as:

$$P = C * n_i * f$$

For example, as represented in the above expression, "P" may represent the power consumed by a processing unit, "C" may represent a constant (e.g., such as capacitance), "$n_i$" may represent an amount of cycles, and "f" may represent a clock rate of the processing unit. By performing a power scaling technique (e.g., undervolting, underclocking, etc.), network device 210 may decrease the clock rate of a processing unit, and thereby decrease the power consumption of the processing unit.

In some implementations, network device 210 may perform the power scaling technique, such that the critical path execution time satisfies the path execution time. That is, network device 210 may perform the power scaling technique such that the path execution time of a path may increase (e.g., as compared to if the power scaling technique is not performed), however such that the path execution time may not satisfy the critical path execution time. In other words, network device 210 may perform the power scaling technique, such that path execution times of the other paths increase without satisfying the critical path execution time. In this way, network device 210 may decrease power consumption, may reduce heat generation, may reduce a need for cooling components to operate, may increase efficiency, etc.

In some implementations, network device 210 may determine a difference between the critical path execution time and a path execution time of another path, and may perform the power scaling technique such that the path execution time of the other path is increased by an amount of time associated with the difference between the critical path execution time and the path execution time. Additionally, or alternatively, network device 210 may determine, for a level, a difference between an execution time of a task associated with the critical path and an execution time of a task associated with another path, and may perform the power scaling technique such that the execution time of the task associated with the other path is increased by an amount of time associated with the difference between the execution time of the task associated with the critical path and the execution time of the task associated with the other path. Additionally, or alternatively, network device 210 may offset time differences (e.g., as described above) by an amount of time by which a task associated with the critical path is executed (e.g., provided for execution) before another task associated with the other path. That is, tasks associated with the critical path may be provided to a processing unit for execution before (e.g., by a particular amount of time) other tasks, and thus network device 210 may offset the path execution times by the particular amount of time (or times).

In some implementations, network device 210 may schedule and/or provide tasks, associated with the critical path, to particular processing units for execution. For example, network device 210 may provide tasks, associated with the critical path, to processing units that include processing metrics that satisfy thresholds, or the like. Additionally, or alternatively, network device 210 may schedule and/or provide tasks, associated with other paths, to particular processing units that do not include processing metrics that satisfy thresholds. In this way, network device 210 may reduce a total amount of time associated with execution of the set of tasks by providing tasks associated with the critical path (e.g., tasks that may include greater execution times than tasks associated with other paths) to particular processing units that may include improved processing metrics as compared to other processing units.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein enable a network device to identify precedence constraints associated with a set of tasks, and schedule and/or execute the set of tasks based on the precedence constraints such that an overall amount of time associated with execution of the set of tasks is reduced. For example, by prioritizing tasks associated with a critical path over other tasks, the network device may reduce the overall amount of time (e.g., as compared to if other tasks are prioritized over tasks associated with the critical path). In this way, implementations described herein may reduce latency, increase throughput, conserve processor and/or memory resources of the network device, and/or conserve network resources.

Additionally, implementations described herein enable the network device to perform a power scaling technique in association with other paths besides the critical path. In this way, the network device may increase path execution times of the other paths while decreasing power consumption. However, the path execution times (e.g., the increased path execution times) may not satisfy the critical path execution time. In this way, the set of tasks may continue to be executed in a particular amount of time (e.g., dictated by the critical path) despite an increase in particular path execution times.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive information that identifies a set of tasks to be executed and precedence constraints associated with the set of tasks;
      determine a set of paths based on the information that identifies the set of tasks and precedence constraints associated with the set of tasks,
         each path, of the set of paths, including particular tasks of the set of tasks;
      determine a set of path execution times, for the set of paths, based on an artificial intelligence technique;
      determine a first path, of the set of paths, based on the set of path execution times;
      identify a second path of the set of paths;
      determine a difference between a first path execution time of the first path and a second path execution time of the second path; and
      perform a power scaling technique based on the difference,
         the second path execution time to be increased based on the power scaling technique.

2. The device of claim 1, where the one or more processors when, determining the difference between the first path execution time of the first path and the second path execution time of the second path, are to:
   determine that the first path execution time of the first path is greater than the second path execution time of the second path.

3. The device of claim 1, where the one or more processors when, performing the power scaling technique based on the difference, are to:

perform one or more of:
   a dynamic voltage scaling technique,
   an undervolting technique, or
   an underclocking technique.
4. The device of claim 1, where the one or more processors when, performing the power scaling technique based on the difference, are to:
   perform the power scaling technique to reduce power consumption based on one or more of:
      a capacitance,
      an amount of cycles, and
      a clock rate.
5. The device of claim 1, where the one or more processors are further to:
   increase a third path execution time by an amount of time associated with the difference.
6. The device of claim 1, where the one or more processors are further to:
   offset a time difference by executing one or more tasks, of the set of tasks, associated with the first path prior to executing other tasks of the set of tasks.
7. The device of claim 1, where the one or more processors are further to:
   store the set of tasks in a data structure including a directed acyclic graph based on the information that identifies the set of tasks to be executed and the precedence constraints associated with the set of tasks.
8. A non-transitory computer-readable medium storing instructions, the instructions comprising:
   one or more instructions that, when executed by one or more processors, cause the one or more processors to:
      receive information that identifies a set of tasks to be executed and precedence constraints associated with the set of tasks;
      determine a set of paths based on the information that identifies the set of tasks and precedence constraints associated with the set of tasks,
         each path, of the set of paths, including particular tasks of the set of tasks;
      determine a set of path execution times, for the set of paths, based on an artificial intelligence technique;
      determine a first path, of the set of paths, based on the set of path execution times;
      identify a second path of the set of paths;
      determine a difference between a first path execution time of the first path and a second path execution time of the second path; and
      perform a power scaling technique based on the difference,
         the second path execution time to be increased based on the power scaling technique.
9. The non-transitory computer-readable medium of claim 8, where the one or more instructions, that determine the difference between the first path execution time of the first path and the second path execution time of the second path, cause the one or more processors to:
   determine that the first path execution time of the first path is greater than the second path execution time of the second path.
10. The non-transitory computer-readable medium of claim 8, where the one or more instructions, that perform the power scaling technique based on the difference, cause the one or more processors to:
   perform one or more of:
      a dynamic voltage scaling technique,
      an undervolting technique, or
      an underclocking technique.
11. The non-transitory computer-readable medium of claim 8, where the one or more instructions, that perform the power scaling technique based on the difference, cause the one or more processors to:
   perform the power scaling technique to reduce power consumption based on one or more of:
      a capacitance,
      an amount of cycles, and
      a clock rate.
12. The non-transitory computer-readable medium of claim 8, where the one or more instructions, when executed by the one or more processors, further cause the one or more processors to:
   increase a third path execution time by an amount of time associated with the difference.
13. The non-transitory computer-readable medium of claim 8, where the one or more instructions, when executed by the one or more processors, further cause the one or more processors to:
   offset a time difference by executing one or more tasks, of the set of tasks, associated with the first path prior to executing other tasks of the set of tasks.
14. The non-transitory computer-readable medium of claim 8, where the one or more instructions, when executed by the one or more processors, further cause the one or more processors to:
   store the set of tasks in a data structure including a directed acyclic graph based on the information that identifies the set of tasks to be executed and the precedence constraints associated with the set of tasks.
15. A method comprising:
   receiving, by a device, information that identifies a set of tasks to be executed and precedence constraints associated with the set of tasks;
   determining, by the device, a set of paths based on the information that identifies the set of tasks and the precedence constraints associated with the set of tasks,
      each path, of the set of paths, including particular tasks of the set of tasks;
   determining, by the device, a set of path execution times, for the set of paths, based on an artificial intelligence technique;
   determining, by the device, a first path, of the set of paths, based on the set of path execution times;
   identifying, by the device, a second path of the set of paths;
   determining, by the device, a difference between a first path execution time of the first path and a second path execution time of the second path; and
   performing, by the device, a power scaling technique based on the difference,
      the second path execution time to be increased based on the power scaling technique.
16. The method of claim 15, where determining the difference between the first path execution time of the first path and the second path execution time of the second path comprises:
   determining that the first path execution time of the first path is greater than the second path execution time of the second path.
17. The method of claim 15, where performing the power scaling technique based on the difference comprises:
   performing one or more of:
      a dynamic voltage scaling technique,
      an undervolting technique, or
      an underclocking technique.

18. The method of claim 15, further comprising:
increasing a third path execution time by an amount of time associated with the difference.

19. The method of claim 15, further comprising:
offsetting a time difference by executing one or more tasks, of the set of tasks, associated with the first path prior to executing other tasks of the set of tasks.

20. The method of claim 15, further comprising:
storing the set of tasks in a data structure including a directed acyclic graph based on the information that identifies the set of tasks to be executed and the precedence constraints associated with the set of tasks.

\* \* \* \* \*